Sept. 8, 1931.  P. M. G. TOULON  1,822,758
SYSTEM FOR TRANSMITTING AND AMPLIFYING
VIBRATORY CURRENTS AND MOVEMENTS
Filed Sept. 16, 1929   2 Sheets-Sheet 1
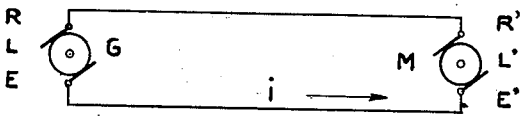
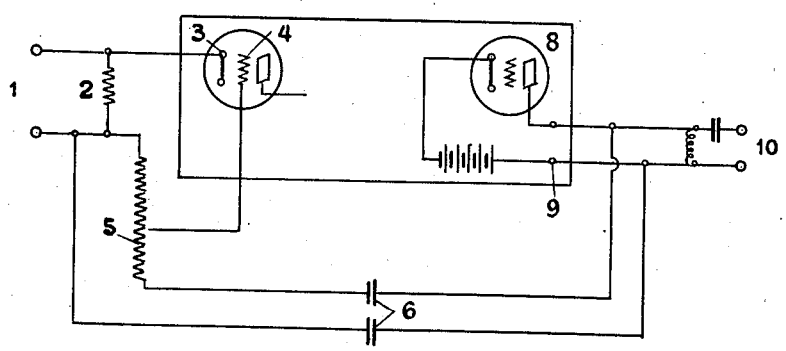
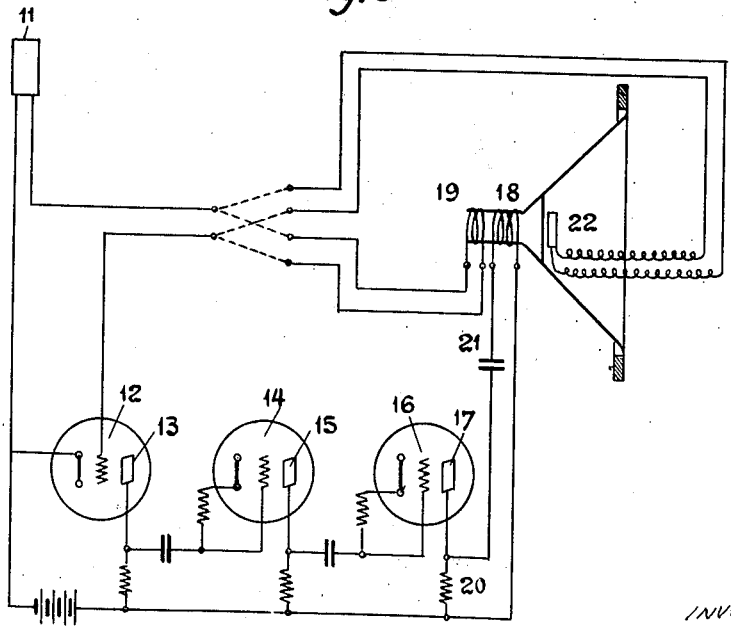
INVENTOR:
P. M. G. Toulon
By Marks & Clerk
Attys.

Sept. 8, 1931.   P. M. G. TOULON   1,822,758
SYSTEM FOR TRANSMITTING AND AMPLIFYING
VIBRATORY CURRENTS AND MOVEMENTS
Filed Sept. 16, 1929   2 Sheets-Sheet 2

INVENTOR:
P. M. G. Toulon

Patented Sept. 8, 1931

1,822,758

UNITED STATES PATENT OFFICE

PIERRE MARIE GABRIEL TOULON, OF PUTEAUX, FRANCE

SYSTEM FOR TRANSMITTING AND AMPLIFYING VIBRATORY CURRENTS AND MOVEMENTS

Application filed September 16, 1929, Serial No. 392,907, and in France September 21, 1928.

The present invention relates to electric systems for transmitting and amplifying vibratory movements, such as acoustic vibrations, and it chiefly concerns a new electric arrangement of amplifiers which is particularly adapted for the supply of loud-speakers and assures a most accurate reproduction.

An accurate amplifier has been hitherto considered as a device which is free from distortion, that is to say, it has been desired to obtain amplifying valves having perfectly rectilinear characteristics, as well as transformers having a linear responding curve, and like features.

In the case of amplifiers having several amplifying steps and hence comprising numerous parts, it is found very difficult to obtain all of these features at the same time, and on the other hand, due account is not taken of the reaction of the amplifying upon the feeding circuit, nor of the reaction of the loud-speaker upon the output circuit.

The present invention is based upon a different principle, which consists in comparing the result obtained with the result which it is desired to obtain, so that all lack of harmony between these two elements will disappear by a spontaneous action. It is not desired to render each element of the amplifier as exact as possible; these are constructed in an ordinary manner, but are so disposed that the apparatus will correct itself spontaneously as soon as any defect occurs. It is possible, for instance, to compare the drop of the tension furnished by the output current of the amplifier (or the displacements of the diaphragm of the loud-speaker) with the alternating tension supplied at the input end of the apparatus, in such manner as to obtain exact proportionality at all times.

From a practical point of view, the invention is essentially characterized by the fact that the grid of the first valve is not connected directly to the input circuit of the amplifier, but is connected to two groups adapted to supply tensions at each instant which substantially balance one another. The first group furnishes a tension which is proportional to the input tension of the amplifier; the second group furnishes a tension proportional to the counter E. M. F. of the work circuit, or to the displacements of the diaphragm of the loud-speaker.

The current in the amplifier no longer depends upon the input tension, but upon the difference between the input tension and the counter-tension at the output of the apparatus.

One arrangement according to the invention consists in use of this principle in the construction of an amplifier alone, without interfering with the feeding circuit or with the work circuit itself. For this purpose, the plate current is simply compared with the input current by a set of two resistances which are properly balanced.

Another method consists in continuing the control to the maximum, that is, in comparing the displacement of the diaphragm of the microphone (or of the needle of the pick-up) with the displacement of the diaphragm of the loud-speaker, or even with the diaphragm of a second microphone receiving acoustic energy furnished by the first microphone.

The object and the importance of the invention will be better understood by comparison with various methods in current use, relating to the operation of dynamo electric machines, as shown in the diagram, Figure 1.

The generator G supplies an E. M. F. E, and it has a resistance R and a self-induction L. As regards the transmission of energy, this resistance and self-induction only represent defects due to the imperfection of the usual materials, and it would be preferable if L and R has zero values, for the better operation of the device.

The motor M has a counter E. M. F. E', a resistance R', and a self-induction L'.

The current I only appears if the two machines operate at the same speed (or are displaced by a certain angle). If both machines operate on no load, the current I is practically zero. The power supplied by the first machine is E I, and the power received by the second machine is E' I.

When no mechanical power is transmitted from G to M, I has a zero value.

If for any reason the speed of G increases, a current is produced in the circuit, and this current increases the speed of the motor M until it attains the speed of the generator G. At this time there is practically no current in the line. If the motor M is prevented from increasing its speed, the current rises to a very great value in the line, and the generator will be burned out. It is observed that equal speeds and couples for the two machines G and M will result from the fact that the transmission line is reversible and that the two machines are thus electrically coupled.

By comparing the generator G with the microphone, the transmission line with the amplifier, and the motor M with the loud-speaker, it is observed that in the current arrangements such a connection will be impossible, since the amplifier has characteristics that are not reversible.

In fact when the microphone is employed to raise the grid of a three-electrode valve to a given tension, the current furnished by the grid does not depend upon the reaction of the loud-speaker connected to the output plate. The reaction, if any takes place, is very complex, and is often in the contrary direction to what is desired. The loud-speaker reacts in fact upon the plate of the three-electrode bulb, but this reduces its apparent tension and does not produce an equal and contrary tension on the grid of the said valve.

To connect the diaphragm of the microphone to that of the loud-speaker, it is necessary to obtain conditions similar to those of the electric transmission between the two machines G and M, which transmission connects their shafts by electric means.

To oblige the diaphragm of the loud-speaker to follow the same movements as the microphone, it is necessary that the loud-speaker, while under the control of the amplifier shall react automatically, and thus by its displacement it will annul or balance the amplified current.

This result can only be attained in conformity to the principle of the three-electrode valve (which is not reversible) by a direct reaction of the loud-speaker upon the current furnished by the microphone.

Obviously the same considerations will apply to the case in which only an amplifier is to be utilized. The condition of an accurate transmission in the line (consisting of the amplifier) will be realized if the input E. M. F. can be constantly balanced, by reversible action, by means of a counter E. M. F. furnished at the output end.

Contrary to what has been hitherto admitted, the question of the exact proportionality between the grid tension and the plate current is altogether secondary, and this is not a necessary feature if the output current, upon its appearance, reacts upon the source of current at the input end in such manner as to balance it as rapidly as possible.

The accuracy will be hardly affected by the imperfections in the transmission line, provided the electromotive forces of the two machines can be balanced in a constant and regular manner. It matters little whether the line has a somewhat greater or less resistance, provided in all cases a heavy current results from the differences of speed, and at once increases the speed of the machine operating at the slower rate, or inversely.

The present invention which is a practical application of the aforesaid considerations, comprises the following arrangements which may be employed separately or in combination; these are given solely by way of example and are not of a limitative nature.

1. The input current of the amplifier is sent through a resistance, so as to obtain in the first place a tension which is a known function of the power at the start.

2. There are disposed in series a certain number of amplifying steps, of increasing power, until the obtainment of a sufficient value to operate the requisite loud-speaker or any other receiving device. This amplifying is so effected as to provide a time constant of the minimum value. The time constants of the input circuit are slightly increased, if necessary (for instance by condensers), so that the reaction of the amplifier will be practically instantaneous with reference to the frequencies to be transmitted, even for the highest harmonics of the music to be reproduced.

From a practical standpoint, the valves in use preferably consist of lamps with horns (so as to possess the least parasitic capacity) and of lamps with screen grid by which the amplifying of such valves is made quite independent of the characteristics of the input and the output circuits of each stage. For like reasons, the different stages are each disposed in a separate protected case, thus affording the best protection against external effects of a magnetic, elastic or acoustic nature.

The coupling arrangements for the said valves must have practically no inertia, and the resistance-capacity coupling is preferably employed. The coupling capacities, used between the plate of one valve and the grid of the next valve, are very high, in such manner that the very slow displacements, that is, even the very low frequencies, will be accurately reproduced. The discharge resistances of the grids will be relatively very small, thus affording a large current relatively to the grid current. Hence the mean potential of the grid will be made quite uniform, and the amplifying power of the valve is well defined. The value of the plate potential relatively to the filament should have no effect upon the amount of current furnished, and thus the plate current will depend solely upon the grid tension.

3. There is taken from the output circuit (the plate circuit of the last valve) a portion of the amplified power, and this is converted into a difference of potential which is a known function of the input power, for instance by means of a resistance or a potentiometer. The resulting tension is opopsed to the tension of the input circuit.

The accompanying drawings show various particular arrangements according to the invention.

Fig. 1 is a diagram of an electric power transmission arrangement.

Fig. 2 shows the method of control in the case of an amplifier when used alone.

Fig. 3 shows the method of control in the case of a microphone combined with a loud-speaker.

Figure 4:
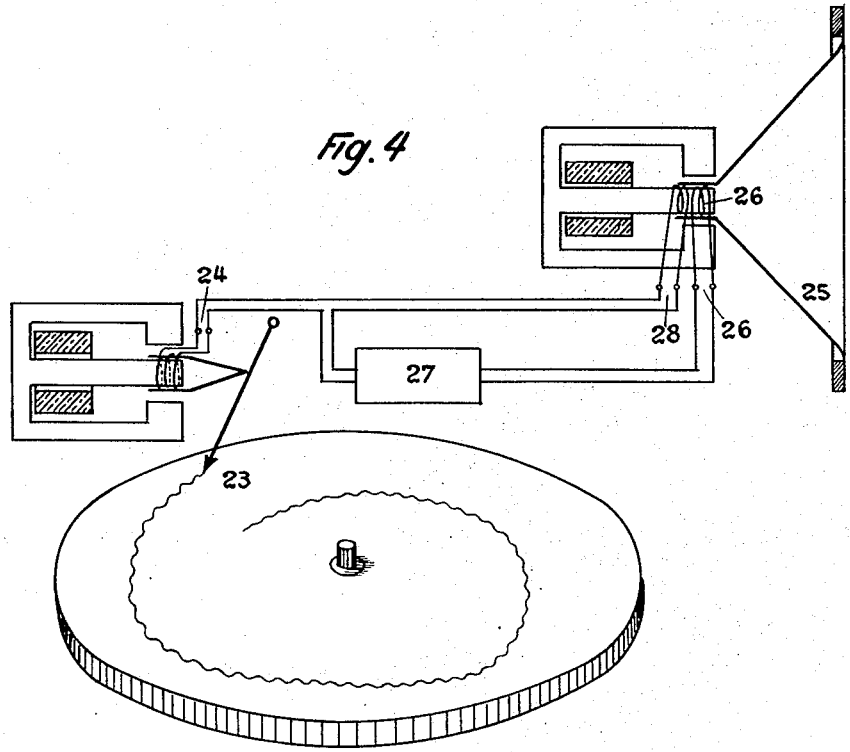
Fig. 4 shows an arrangement employed with a phonograph needle controlled by a loud-speaker.

In all cases, these figures, are given solely by way of example, and are not of a limitative nature.

As shown in Figure 2, the input circuit 1 supplies a resistance 2 connected to the filament 3 of the first three-electrode valve. The plate 8 of the said valve supplies a work circuit 10. Between the high-tension terminal 9 of the battery and the plate 8, there is mounted in parallel with the work circuit (loud-speaker) a resistance 5 which is statically insulated by condensers 6. If desired, the said resistance may be connected to the secondary of a transformer whose primary is connected to 10.

The input grid 4 is not connected to the end of the resistance 2 but is connected to the end of a suitable part of the resistance 5, depending upon the amplifying of the apparatus. The work circuit is connected to the amplifier by a device eliminating the direct current component, such as a self-induction in shunt and a condenser in series.

If the E. M. F. supplied at 2 is exactly equal and contrary to the E. M. F. produced in the work circuit 10, the amplifier will supply practically no current; on the contrary, heavy currents will flow if this condition is not complied with and the apparatus will react in a violent manner in order to place the output under the control of the input.

This affords a constant proportionality between the tensions at the two ends, and thus a very exact reproduction of musical sounds, which are as powerful as may be desired.

Fig. 3 shows by way of example the control which is obtained as far as the diaphragm of an electro-dynamic diffuser.

The microphone is shown at 11, and the movable coil of the loud-speaker at 18; said coil is adjacent a small auxiliary coil 19 affording an E. M. F. which should be exactly equal to the one furnished by the microphone 11, and it thus compensates the latter. The amplifier in fact assures this equilibrium. For this purpose, the grid 12 of the first valve is acted upon by 11 and 19 connected in series. The plate 13 controls in turn, for instance by a resistance and capacity device, the grid 14 of the next valve, whose plate 15 controls (and so on) the grid 16 of the last step. The plate 17 furnishes its alternating current to the winding 18 (by means of the condenser 21) whilst the direct current portion is taken off by the large self-induction 20.

If the diaphragm of the loud-speaker is not absolutely under the control of the diaphragm of the microphone, the amplifier will place it under this control in an energetic manner, and any want of proportionality in the amplifier will be without importance, provided it has a powerful action.

Instead of acting on the control of the said diaphragm, it is possible to employ a second microphone 22 which is situated in front of the loud-speaker and is at a very short distance therefrom, in order to prevent all effects of propagation. Comparison is then made of the tensions produced by the microphones 11 and 22, and only their resultant will act upon the amplifier.

If necessary, an artificial line can be employed with the microphone 11, and thus the time of the propagation between the several parts of the apparatus will be uniform.

Fig. 4 is a diagram showing the principle of the control of a needle of an electric phonograph by the diaphragm of a loud speaker.

The needle 23 is secured to a movable coil 24 disposed in a magnetic field, and any suitable pick-up device may be herein employed. The diaphragm of the load-speaker 23 is secured to a second movable coil 26 which is preferably similar to 24. An auxiliary coil 28, analogous to the coil 19 of Figure 3, is mounted in opposition to 24. The amplifier 27 serves as before to maintain the needle 23 and the diaphragm 25 in constant electrical cooperation, so that any movement of the former will cause an exactly equal movement of the latter, and thus all distortions will be obviated, and the apparatus is of a most accurate character.

Instead of the movable coil, the apparatus may comprise any other electromagnetic device pertaining to the known loud-speakers. If an identical construction is employed for the mechanism producing the microphone currents which is secured to the needle, and the one that is secured to the diaphragm of the diffuser, this will afford, according to the invention, a movement of these two devices which is quite symmetrical and in exact coincidence. Only a neglible power is required for the motion of the needle, but the diaphragm of the diffuser can impart a considerable acoustic energy.

In a simple embodiment of the invention, two similar pick-up devices are employed. The first device is secured to the needle, and the second is secured to the diaphragm of the diffuser. The electromotive forces of these two devices will be in exact opposition only when the movements of the said movable parts are the same.

Figure 5:
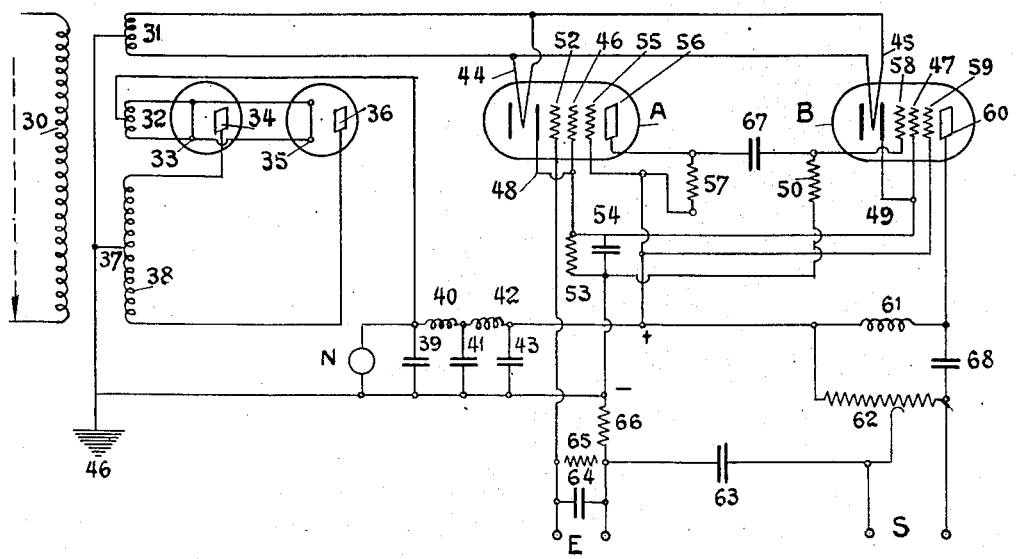
Fig. 5 is a detailed diagram of circuits showing a concrete embodiment of the invention, all the connections being represented.

Fig. 5 shows by way of example a detailed diagram relating to a constructional form of amplifier under control according to the invention, which is entirely supplied by the main line, and the apparatus comprises valves with screen-grid which have a great amplifying power.

An ordinary source of alternating current 29 supplies the primary 30 of a transformer comprising several secondary windings, whereof the first 31 supplies the indirect heating device 44—45 of the cathode of the amplifying valves A and B. The secondary 32 supplies the heating for the filaments 33—35 of the valves affording the plate tension. The plates of said valves 34—36 are connected to the two ends of a third secondary winding 39 whose neutral point 37 is connected to ground at 42. The self-induction coils 40—42 cooperate with the neon lamp N (or a like discharge element) and with condensers 39—41—43, in order to regulate the rectified current thus produced, and these form the parts of a filter, known per se. The valves A and B each comprise a cathode 48—49, indirectly heated, and a screen-grid 46—47 surrounding the modulating grid.

These elements are electrically connected together and are also connected to the negative pole of the circuit supplying the rectified current, by a resistance 53 shunted by a very large condenser 54. The object of such an arrangement is well known. It serves for the negative polarization of the controlling grid. The plate current from the valves causes a difference of potential at the ends of the resistance 53, and thus automatically furnishes the negative tension with reference to the filament which is required in order to supply the controlling grid with a mean tension such as is necessary for the approved functioning of the arrangement.

The screen-grids 55 and 59 are connected together and to the positive terminal of the supply of rectified current. The plate 56 of the valve A is coupled to the grid 58 of the next three-electrode valve B by means of the resistance or self-induction 57 and the condenser 67, and this arrangement affords a connection which is almost entirely free from inertia between the stages, and hence it provides for an almost instantaneous reaction of the amplifier. Resistances of a certain value, 50 and 66 are disposed on the controlling grids 52 and 58, thus automatically reducing their potential to the most favorable value.

The power to be amplified is supplied by the terminals E. The available power is taken from the terminals S.

In conformity to the invention, the power E to be amplified is used to set up a difference of potential in a resistance 65, and a small condenser 64 is mounted at the ends of said resistance, in order that the variations of tension shall be relatively slow with reference to the speed of the reaction of the amplifier, this being effected in order to prevent self-coupling of the oscillations in the apparatus.

In like manner, the power S from the amplifier serves to produce a difference of potential in a resistance 62, or preferably in an adjustable potentiometer. A large condenser 63 is used to place in series, from an alternating point of view, the differences of potential produced in the resistances 62 and 65, even though such resistances are insulated as concerns direct current.

The very large condensers 43 and 54 serve to provide at the end of the resistance 62 the same alternating potential as the cathode 48 of the three-electrode valve, although the absolute value of the tension at each of these two points is different.

According to the invention, the end of the resistance 65 is connected to the controlling grid 52 of the first valve A. The input difference of potential (cathode controlling grid) of said valve A is thus equal to the difference between the power furnished by E and the power taken off at S, or rather, to a certain fraction of this power. As soon as any difference appears between these two powers, the amplifier reacts violently and at once restores the equilibrium.

The work circuit is insulated (as to direct current) from the amplifier by means of the condenser 68, so as to allow the flow, in the loud speaker, only of the alternating component which it should employ. However, the large self-induction 61 provides for the discharge of the direct current produced by the plate.

Obviously, the arrangement herein specified is given solely by way of example and to disclose the principle of the invention, but it is evidently possible to modify the number of valves, their characteristics and connections, the method of producing the input and output tensions, their combinations and the like, within wide limits without departing from the spirit of the invention. The object in view, that is the construction of an amplifier which is free from distortion and affords an exact musical reproduction, can be attained by the use of all amplifying devices adapted for instant reaction, in which the variable conditions will automatically compensate any lack of balance which may occur between the input and the output ends of the apparatus.

What I claim is:

1. Electric transmission device for giving in a receiver an exactly proportional reproduction of the variation of energy impressed to a transmitter comprising: a transmitter transforming said impressed energy into electrical energy, an amplifier of said electrical energy, a receiver, means to connect in series the transmitter the amplifier and to the receiver, means to collect a part of the output energy, means to transform it into electrical energy, means to impress said latter energy on the input circuit of the amplifier in such a way that said circuit be energized by the difference between the energy coming from the transmitter and said latter part of the output energy.

2. Electric transmission device of acoustic energy giving in a receiver a sound whose intensity is exactly proportional to the sonorous intensity to be transmitted comprising: a transmitter transforming the sonorous energy into mechanical and after into electrical energy, an amplifier of said electrical energy, a receiver transforming the amplified electrical energy, into mechanical and after into sonorous energy, means to connect in series the transmitter the amplifier and the receiver, means to collect a part of the output energy, means to transform it into electrical energy, means to impress said latter energy on the input circuit of the amplifier in such a way that said circuit be energized by the difference between the energy coming from the transmitter and said latter part of the output energy.

3. Electric transmission device for mechanical energy produced by a transmitter allowing to give in a receiver a movement exactly proportional to the movement of a movable part of the transmitter comprising: a transmitter, in said transmitter a movable part, means to transform into electrical energy the mechanical energy applied to said movable part, an amplifier of said electrical energy, a receiver transforming the amplified electrical energy into mechanical energy, means to connect in series the transmitter the amplifier and the receiver, means to collect a part of the mechanical energy received in the receiver, means to transform it into electrical energy, means to impress said latter energy on the input circuit of the amplifier in such a way that said circuit be energized by the difference between the energy coming from the transmitter and said latter part of the output energy.

4. Electric device for transmitting the movements of the needle of a pick-up to the diaphragm of a loud speaker so that said movements be at every moment exactly proportional to each other comprising: a pick up, a vacuum tubes amplifier, means to impress the electrical energy created in said pick-up on the input circuit of said amplifier, a loud speaker, means to connect the output circuit of the amplifier with the coils of the loud speaker, means to create an electric current controlled by the movements of the diaphragm of the loud speaker, means to impress said current on the input circuit of the amplifier in such a manner that it flows at every moment in opposite direction with the current impressed on said input circuit by the pick-up.

5. Electric device for transmitting the movements of the needle of a pick-up to the diaphragm of a loud speaker so that said movements be at every moment exactly proportional to each other comprising: a pick-up, a vacuum tubes amplifier, means to impress the electrical energy created in said pick-up on the input circuit of said amplifier, a loud speaker, means to connect the output circuit of the amplifier with the coils of the loud speaker, an auxiliary coil fastened to diaphragm and able to move in the magnetic field of the loud speaker, means to connect said auxiliary coil to the input circuit of the amplifier in such a way that the current generated in said coil flows at every moment in opposite direction with the current impressed on said input circuit by the pick-up.

In testimony whereof I have affixed my signature.

PIERRE MARIE GABRIEL TOULON.